(12) United States Patent
Heintz

(10) Patent No.: US 10,781,851 B2
(45) Date of Patent: Sep. 22, 2020

(54) PIVOT BEARING ASSEMBLY HAVING A PIVOT PIN AND HAVING AT LEAST ONE BEARING BLOCK AND ASSEMBLY METHOD THEREFOR

(71) Applicant: Terex Global GmbH, Schaffhausen (CH)

(72) Inventor: Rolf Heintz, Langwieden (DE)

(73) Assignee: Terex Global GmbH, Schaffhausen (CH)

( * ) Notice: Subject to any disclaimer, the term of this patent is extended or adjusted under 35 U.S.C. 154(b) by 282 days.

(21) Appl. No.: 15/578,497

(22) PCT Filed: May 31, 2016

(86) PCT No.: PCT/EP2016/062249
§ 371 (c)(1),
(2) Date: Nov. 30, 2017

(87) PCT Pub. No.: WO2016/193254
PCT Pub. Date: Dec. 8, 2016

(65) Prior Publication Data
US 2018/0149189 A1 May 31, 2018

(30) Foreign Application Priority Data

Jun. 2, 2015 (DE) .................. 10 2015 108 725

(51) Int. Cl.
*F16C 11/04* (2006.01)
*F16C 35/02* (2006.01)
(Continued)

(52) U.S. Cl.
CPC ............ *F16C 11/045* (2013.01); *B66C 23/62* (2013.01); *F16C 23/045* (2013.01); *F16C 33/08* (2013.01);
(Continued)

(58) Field of Classification Search
CPC ......... B66C 23/62; B66C 23/64; B66C 23/82; F16C 11/045; F16C 23/045; F16C 33/08;
(Continued)

(56) References Cited

U.S. PATENT DOCUMENTS 1,491,155 A * 4/1924 McKone ................... F16C 9/04
403/150
3,479,051 A * 11/1969 Weiss ....................... B62D 7/18
403/157
(Continued)

FOREIGN PATENT DOCUMENTS

CN 20241375 9/2012
CN 202880715 U 4/2013
(Continued)

OTHER PUBLICATIONS

International Search Report and Written Opinion of the International Searching Authority from corresponding Patent Cooperation Treaty (PCT) Application No. PCT/EP2016/062249, indicated completed on Sep. 5, 2016.
(Continued)

*Primary Examiner* — Josh Skroupa
(74) *Attorney, Agent, or Firm* — Gardner, Linn, Burkhart & Ondersma LLP

(57) ABSTRACT

A pivot bearing assembly includes a pivot pin and at least one bearing block, in which a bearing bush having a bearing bore is accommodated. The pivot pin is slidingly supported in the bearing bore. In order to create an improved pivot bearing assembly, the bearing bush has a rounded outer surface, which is inserted into a negatively rounded inner surface in order to orient the bearing bush.

20 Claims, 2 Drawing Sheets

(51) Int. Cl.
  *F16C 23/04* (2006.01)
  *F16C 33/08* (2006.01)
  *B66C 23/62* (2006.01)

(52) U.S. Cl.
  CPC .......... *F16C 35/02* (2013.01); *F16C 2226/40* (2013.01); *F16C 2326/00* (2013.01); *Y10T 403/32893* (2015.01)

(58) Field of Classification Search
  CPC ............ F16C 2226/40; F16C 2326/00; Y10T 403/32861; Y10T 403/32868; Y10T 403/32893; Y10T 403/32901; Y10T 403/32909; Y10T 403/32918
  USPC ................ 403/150, 151, 154, 155, 156, 157
  See application file for complete search history.

(56) References Cited

U.S. PATENT DOCUMENTS

| | | | | | |
|---|---|---|---|---|---|
| 3,877,581 | A | * | 4/1975 | Auxer | B66C 23/82 212/195 |
| 4,465,392 | A | * | 8/1984 | Lang | F16C 7/026 403/24 |
| 4,729,145 | A | * | 3/1988 | Egner-Walter | F16C 23/045 15/250.21 |
| 5,364,191 | A | * | 11/1994 | Gruber | F16C 23/045 384/153 |
| 6,733,019 | B2 | * | 5/2004 | Diener | B62D 7/16 280/93.51 |
| 7,163,217 | B2 | * | 1/2007 | Bodin | B62D 7/18 280/89.1 |
| 9,533,708 | B2 | * | 1/2017 | Cao | F16C 11/045 |
| 2003/0137120 | A1 | * | 7/2003 | Thompson | B62D 7/16 280/93.511 |
| 2006/0088371 | A1 | * | 4/2006 | Dunn | F16C 11/0614 403/122 |
| 2014/0210173 | A1 | * | 7/2014 | Conaway | B60G 5/04 280/86.5 |

FOREIGN PATENT DOCUMENTS

| | | | | |
|---|---|---|---|---|
| DE | 1575531 | A1 | 1/1970 | |
| DE | 2136464 | A1 | 7/1972 | |
| DE | 4403287 | A1 | 8/1995 | |
| DE | 29606489 | U1 | 6/1996 | |
| DE | 19603966 | A1 | 7/1997 | |
| DE | 294307 | B5 | 8/1997 | |
| DE | 10139969 | A1 | 2/2003 | |
| DE | 102008047270 | A1 | 4/2010 | |
| FR | 2635751 | A1 * | 3/1990 | ............ F16C 11/045 |
| WO | 2004092490 | A1 | 10/2004 | |
| WO | WO-2004104428 | A2 * | 12/2004 | .............. B64D 27/26 |
| WO | WO-2005042991 | A1 * | 5/2005 | ............ F16C 23/045 |
| WO | WO-2009059588 | A2 * | 5/2009 | ............ F16C 23/045 |

OTHER PUBLICATIONS

International Preliminary Examination Report from corresponding Patent Cooperation Treaty (PCT) Application No. PCT/EP2016/062249, dated May 22, 2017.
Preliminary Report on Patentability of the International Searching Authority in English from corresponding Patent Cooperation Treaty (PCT) Application No. PCT/EP2016/062249, completed Sep. 29, 2017.

* cited by examiner

PIVOT BEARING ASSEMBLY HAVING A PIVOT PIN AND HAVING AT LEAST ONE BEARING BLOCK AND ASSEMBLY METHOD THEREFOR

CROSS REFERENCE TO RELATED APPLICATIONS

The present application claims the priority benefits of International Patent Application No. PCT/EP2016/062249, filed May 31, 2016, and claims benefit of German Application DE102015108725.1, filed on Jun. 2, 2015, which are incorporated herein by reference.

BACKGROUND OF THE INVENTION

The invention relates to a pivot bearing assembly comprising a pivot pin and at least one bearing block, in which a bearing bush having a bearing bore is received and the pivot pin is slidingly supported in the bearing bore.

The invention also relates to an assembly method for such a pivot bearing assembly.

German laid-open document DE 2 136 464 discloses a pivot bearing assembly for a cantilevered and extendible jib of a travelling crane. The jib can typically be pivoted in the region of its base about a horizontal pivot pin by means of a luffing cylinder. The pivot pin is a component of the pivot bearing assembly, with which the jib is articulated to a centre pivot plate. The centre pivot plate has two mutually spaced apart and vertical side plates, on which in each case a bearing block of the pivot bearing assembly is arranged. The bearing blocks are each secured against rotation and receive a cylindrical bearing bush which is preferably made of bronze. The pivot pin for the pivot bearing of the jib is received by the two mutually aligned bearing bushes. In addition, the bushes have, on mutually facing sides, an annular flange which lies in each case against the jib. As a result, the bearing bushes are used not only for the pivot bearing of the jib but also for the lateral guidance thereof.

In order to ensure that the pivot bearing can move freely and to minimise wear of the bearing bush made of bronze on the pivot pin made of e.g. steel, the bearing bushes are lubricated with grease. Such pivot bearing assemblies are loaded with relatively strong forces and under such loading perform only small angular movements which, in the present case, are less than approximately 90°. This results in pressures of e.g. up to 150 N/mm$^2$ in the bearing bushes and therefore upon the grease. It follows from this that the grease escapes and/or does not pass easily to the loaded points of the bearing bushes. Lubrication grooves are used in an attempt to distribute the grease in the bearing bush. Nevertheless, it is almost unavoidable that the grease escapes and the bearing bush begins to run dry and wear out. Associated with this is then the so-called slip-stick effect which results in a non-uniform movement of the pivot bearing assembly as a result of sticking and slipping. By reason of this slip-stick effect, the hydraulics of the luffing cylinder and the steel construction of the jib can be caused to vibrate. During crane operation, these vibrations can make it more difficult to perform delicate work or to position the jib.

Furthermore, German laid-open document DE 1 575 531 A already describes sliding bearings which typically have an outer ring and inner ring. In this case, the outer ring and the inner ring are in contact via a rounded surface which forms a sliding bearing. This can permit angular movements of the components to be mounted. The outer ring and the inner ring can be produced from synthetic material. However, this should be possible only for low sliding speeds because the poor thermal conductivity of the synthetic material cannot dissipate the heat produced in the sliding bearing.

Furthermore, laid-open document DE 10 2008 047 270 A1 already discloses a bearing element which is used as a rudder bearing of a ship rudder. This bearing element receives a rotatable shaft which is mounted in the bearing element so as to be able to rotate about its longitudinal axis. For this purpose, the shaft is slidingly supported in a bearing bush which is received by an intermediate bearing ring. The intermediate bearing ring has externally a convexly curved sliding surface which is in engagement with a complementarily curved sliding surface of a bearing outer ring. The curved sliding surfaces are to be able to compensate for any alignment errors of the shaft. In order to prevent the intermediate bearing ring from rotating with respect to the bearing outer ring, the sliding surface of the intermediate bearing ring is roughened.

Furthermore, Chinese utility model CN 202 880 715 U a tower slewing crane comprising a luffing jib which can be luffed about a bearing assembly with two bearing elements which are arranged at a spaced interval and opposite one another. Each of these bearing elements is designed as a so-called spherical bearing which can compensate for alignment errors of axles and consists of an outer bearing ring which is slidingly supported on an inner bearing ring. The contact surfaces between the outer bearing ring and the inner bearing ring are convex or concave in order to compensate for said alignment errors. The rotation in the spherical bearing element takes place between its inner and outer bearing ring on its contact surfaces.

SUMMARY OF THE INVENTION

The object of the present invention is to provide an improved pivot bearing assembly comprising a pivot pin and two mutually spaced apart bearing blocks, and to provide an improved assembly method therefor.

This object is achieved by means of a pivot bearing assembly comprising a pivot pin and two mutually spaced apart bearing blocks having the features of claim 1 and is achieved by means of an assembly method for such a pivot bearing assembly having the features of claim 14. Advantageous embodiments of the invention are described in dependent claims 2 to 13 and 15.

In accordance with the invention, in the case of a pivot bearing assembly comprising a pivot pin and at least one bearing block, in which a bearing bush having a bearing bore is received and the pivot pin is slidingly supported in the bearing bore, characterised in that the bearing bush has a rounded outer surface which is inserted in a negatively rounded inner surface in order to orient the bearing bush, and the bearing bush, after being oriented, is fixed in the bearing block.

Even in the event of small angular movements of the bearing bushes on the pivot pin, the orientability of the bearing bush serves to avoid vibration excitations which are attributed to the slip-stick effect. These pivot bearing assemblies can also be used to easily compensate for tolerances in the arrangement of the bearing blocks with respect to one another or of a bearing block with respect to further machine parts.

In this case, the bearing block is preferably welded on a strap frame. Therefore, welding distortion can be compensated for by rotating the bearing bushes prior to them being fixed. It is thus possible to avoid machining the bearing surfaces for the bearing bushes after welding of the bearing blocks, whereby the associated steel construction becomes simpler and more cost-effective overall.

In this case, the negatively rounded inner surface is preferably formed in a bearing block bore.

A further simplification of the design is achieved by virtue of the fact that the two bearing bushes are each directly adhered into the bearing block.

Alternatively, the negatively rounded inner surface is preferably formed in an intermediate ring which is inserted into the bearing block bore.

A further simplification of the design is achieved by virtue of the fact that the bearing bush is adhered into the intermediate ring and/or the intermediate ring is adhered or pressed in each case into the bearing block bore.

Two bearing blocks may be spaced apart from one another and support a common pivot pin.

In conjunction with the embodiment having two mutually spaced apart bearing blocks, the two bearing bushes, after being oriented, may be fixed in the bearing block in such a manner that, as seen in the longitudinal direction of the pivot pin, the bearing bores of the bearing bushes are aligned with one another. Even in the event of small angular movements of the bearing bushes on the pivot pin, the mutually aligned bearing bores serve to avoid vibration excitations which are attributed to the slip-stick effect. These pivot bearing assemblies can also be used to easily compensate for tolerances in the assembly of the bearing blocks with respect to one another.

Simple assembly and construction are achieved by virtue of the fact that the bearing bore is cylindrical.

Provision may be made that the bearing bush is produced from synthetic material, in particular having a sliding layer. This successfully prevents, in conjunction with the mutually aligned bearing blocks or bearing bushes to be oriented, so-called stick-slip effects from occurring in particular in pivot bearing assemblies which are loaded by relatively strong forces and under such loading perform only small angular movements. As a result, the number of corresponding complaints is reduced and the manufacturer or operator is no longer required to effect any lubrication.

The pivot bearing assembly may be used in a mobile crane, in which a first pivot bearing assembly is arranged between a superstructure and a base of a jib and/or a second pivot bearing assembly is arranged between the superstructure and a luffing cylinder and/or a third pivot bearing assembly is arranged between the jib and the luffing cylinder.

In this case, the at least one bearing block may be welded to the superstructure or the jib.

In conjunction with the welding of the bearing blocks, a welding distortion is produced so that the bearing block bores of the opposite bearing blocks have an alignment error with respect to one another. Instead of an otherwise typical complex and expensive subsequent machining of bearing block bores of the bearing blocks on the large and heavy jibs, in order to eliminate the alignment error, the bearing bushes are rotated accordingly in the bearing blocks and are then fixed in aligned orientation. The bearing blocks are already machined prior to welding, the otherwise cylindrical bearing block bores do not have to be machined.

On the whole, this avoids the slip-stick effect, whereby the jibs no longer judder during luffing. More delicate travel movement and positioning of the jib is thus possible.

In accordance with an aspect of the invention, by means of a method of assembling a pivot bearing assembly comprising a pivot pin and at least one bearing block, in which a bearing bush having a bearing bore is received and the pivot pin is slidingly supported in the bearing bore, an improved pivot bearing is achieved by virtue of the fact that the bearing bush which has a rounded outer surface is inserted into a negatively rounded inner surface and the bearing bush is oriented, and the bearing bush, after being oriented, is fixed in the bearing block.

The bearing bush may be adhesively fixed in the bearing block.

BRIEF DESCRIPTION OF THE DRAWINGS

The invention will be explained in greater detail hereinafter with the aid of an exemplified embodiment illustrated in the drawing, in which.

DETAILED DESCRIPTION OF THE PREFERRED EMBODIMENT

Figure 1:
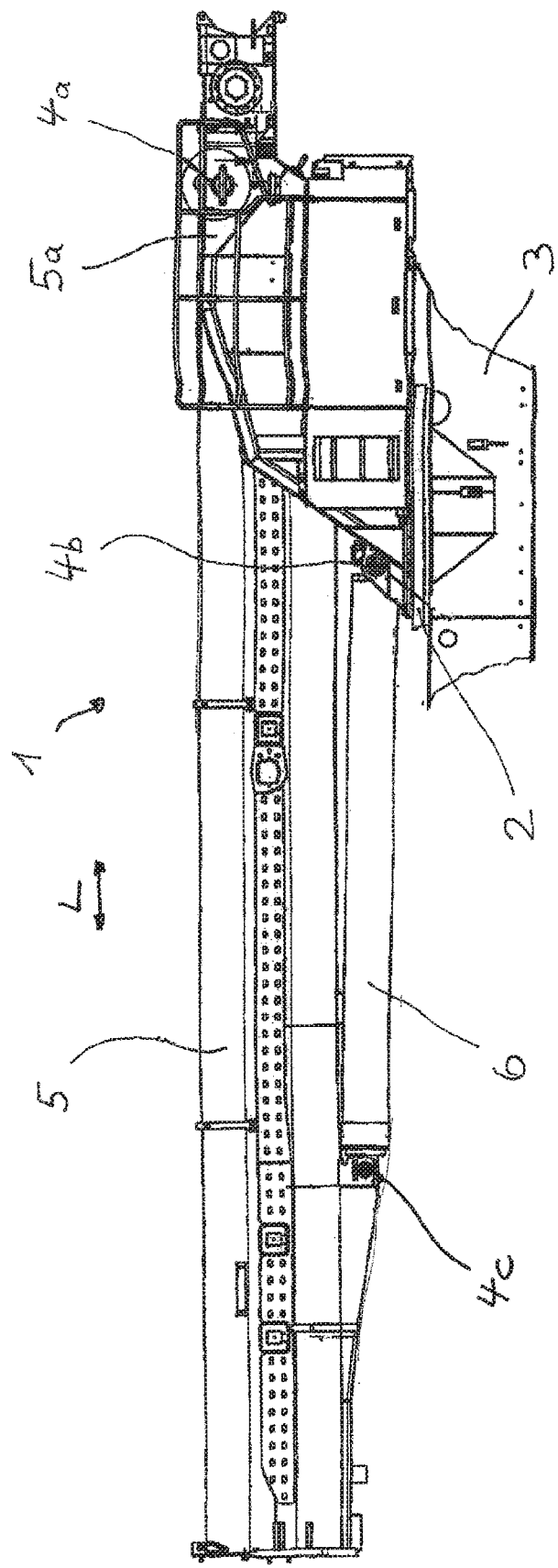
FIG. 1 shows a schematic overall view of a superstructure with a jib mounted thereon.

FIG. 1 shows a schematic overall view of a superstructure 1 of a mobile crane, not illustrated. The superstructure 1 is typically mounted on a lower carriage 3 by means of a rotational connection 2 in such a manner as to be able to pivot about a vertical axis. For reasons of clarity, the lower carriage 3 is illustrated only by a portion of a frame part. A telescopic jib 5 having a central longitudinal direction L is mounted on its base 5a on the superstructure 1 via a first pivot bearing assembly 4a, in order to be able to upright said jib by means of a luffing cylinder 6. Typically, this luffing cylinder 6 is mounted on the superstructure 1 via a second pivot bearing assembly 4b and is mounted on the jib 5 via a third pivot bearing assembly 4c.

Figure 2:
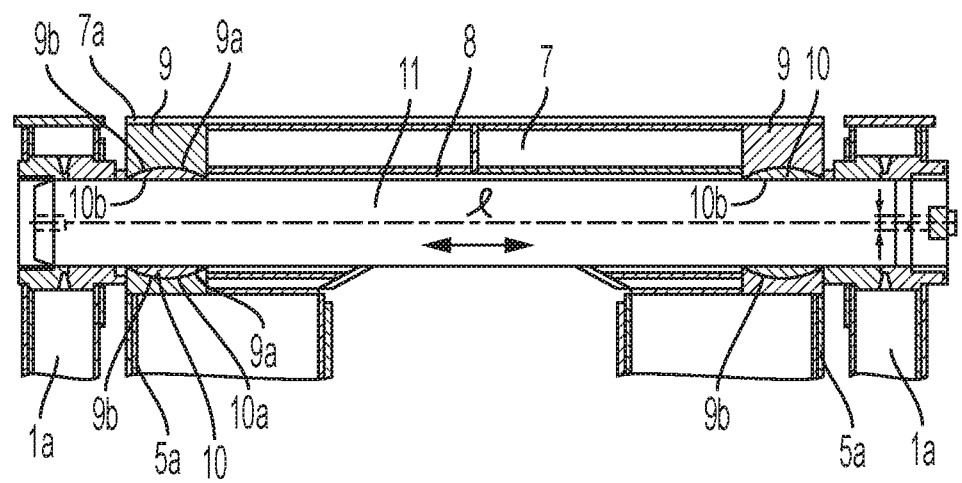
FIG. 2 shows a sectional view of a pivot bearing assembly of the jib shown in FIG. 1.

FIG. 2 illustrates a rear sectional view of the first pivot bearing assembly 4a of the jib 5. From the base 5a of the jib 5, essentially only a part of a strap frame 7 is illustrated which extends over the entire width of the jib 5 and defines a strap bore 8 extending centrally over the width of the jib 5. The strap bore 8 extends at a right angle to the longitudinal direction L of the jib 5. The strap frame 7 comprises, on its lateral and opposite ends, apertures 7a, into which in each case one of two bearing blocks 9 is inserted and subsequently welded to the strap frame 7 and the adjoining base 5a of the jib 5. A bearing block 9 is understood to be a construction element, with which a rotating pivot pin 11 can be mounted and in this case axial and transverse forces are absorbed in order to keep the pivot pin 11 in its position and to allow it to perform only one rotation. The bearing blocks 9 typically define a bearing bore 9a which is not cylindrical, as is typical, but instead a slightly negatively rounded or concave inner surface 9b is finish-bored. In this case, rounded is understood to mean a slight inner curvature of the inner surface 9b. The curvature is circular arc-shaped with a large radius. This understanding also applies to a correspondingly rounded outer curvature. The bearing block bores 9a of the bearing blocks 9 are each oriented in extension of the strap bore 8. In order to receive a pivot pin 11, the bearing block bores 9a of the opposite bearing blocks 9 should preferably be aligned with one another. Clearance exists between the outer surface of the pivot pin 11 and the inner surface of the strap bore 8 because the pivot pin 11 is supported in the two bearing blocks 9.

During production of the jib 5, the bearing blocks 9 are welded into the strap frame 7. In this case, it is natural for a certain degree of welding distortion to occur which results in alignment errors between the two bearing block bores 9a. Since the apertures 7a for the bearing blocks 9 are provided in the upper region of the jib 5 and therefore are arranged on a more stable lower region of the jib 5, the bearing blocks 9 yield by reason of the welding distortion such that, as seen in the longitudinal direction L of the jib 5 and from below on the base 5a of the jib 5 (corresponds to the view shown in FIG. 2), the bearing blocks 9 in the strap frame 7 are tilted with their outer ends slightly inwards and their bearing block bores 9a have an alignment error with respect to one another. A welding distortion which is to be corrected thus occurs substantially only in a common plane of the two bearing blocks 9. As seen in the longitudinal direction L of the jib 5, after welding, the orientation of the bearing blocks 9 with respect to one another is maintained or changes in parallel with one another so that the longitudinal direction L of the jib 5 does not have to be oriented at a right angle to the axes of the bearing block bores 9a. In other words, the welding distortion occurs directed in a plane as seen in the direction of the upper side of the jib 5 in a horizontal jib 5. This can be effectively compensated for by the pivot bearing assembly in accordance with the invention and the parallelism of the jib 5 with the centre line of the superstructure is maintained. The welding distortion which occurs is in the range of approximately 1 to 2 degrees in relation to the oriented starting position prior to welding.

Bearing bushes 10 having a rounded or convex outer surface 10a are then inserted in these typically non-aligned bearing block bores 9a. The bearing bushes 10 are slotted or split for the insertion procedure into the negatively rounded inner surface 9b of the bearing block 9. The bearing bushes 10 thus have an interrupted bearing surface. Since the pivot pin 11 does not rotate in the bearing bush 10 but instead performs only small angular movements in the region of less than 90 degrees, the region of the interruption of the bearing surface can be easily oriented in a non loaded region. In addition to the outer surface 10a, the bearing bushes 10 have a centrally cylindrical bearing bore 10b, into which the pivot pin 11 is inserted.

Since the outer surface 10a of the bearing bush 10 and the inner surface 9b of the bearing block bore 9a are rounded or negatively rounded and at the same time complement one another, i.e. in other words lie in a planar manner against one another, a rotation of the two bearing bushes 10 in the opposite bearing blocks 9 can ensure in each case that they are aligned with one another. The complementation is achieved by virtue of the fact that the radii of the circular arcs of the roundedness of the outer surface 10a and the inner surface 9b are identical. The outer surface 10a and the inner surface 9b are thus in contact in a form-fitting manner, even if the bearing bush 10 is split or slotted for assembly purposes and therefore the form-fitting connection is interrupted in sections. After orientation, the bearing bushes 10 are fixed in the bearing bores 9a. This can be effected e.g. by adhering the bearing bushes 10 in the bearing block bores 9a. In this case, provision is made that the adhesive only hardens after the bearing bushes 10 have been oriented. The bearing bushes 10 can also be secured in the bearing block bores 9a in a mechanical manner by means of pins, wedges, bolts, screws, disks or plates which engage the outer surface 10a of the bearing bush 10 axially, radially or obliquely. Fixing can be effected by means of a form-fitting connection or clamping. Adequate fixing can also be easily effected by means of increasing the friction of the outer surface 10a and thus by means of frictional engagement. The fixing procedure ensures that the sliding movement required for pivoting the jib 5 takes place in the first pivot bearing assembly 4a between the pivot pin 11 and the two bearing bushes 10.

The bearing bushes 10 are designed as synthetic material bushes having a sliding layer, also known as a heavy-duty sliding bearings. The synthetic material is fibre-reinforced, preferably synthetic resins having glass and/or carbon fibres.

The pivot pin 11 which is inserted into the bearing bushes 10 protrudes on both sides out from the bearing blocks 9 and thus from the strap frame 7. The protruding ends of the pivot pin 11 are each mounted in a yoke-type frame 1a of the superstructure 1 for conjoint rotation therewith.

Figure 3:
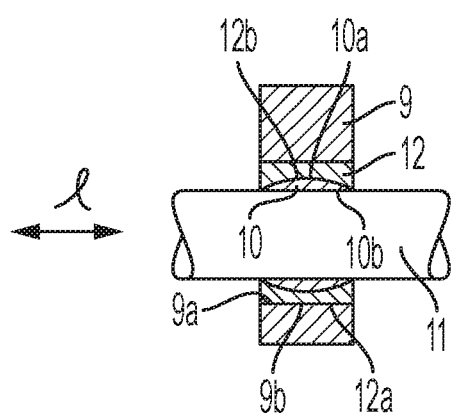
FIG. 3 shows a detailed view of FIG. 2 from the region of a bearing block of the pivot bearing assembly in an alternative embodiment.

FIG. 3 illustrates a detailed view of FIG. 2 from the region of a bearing block 9 of the first pivot bearing assembly 4a in an alternative embodiment, in which the bearing bush 10 is not inserted directly into the bearing block bore 9a of the bearing block 9, but instead is inserted in an intermediate ring 12 arranged at this location. This intermediate ring 12 has a cylindrical outer surface 12a and a negatively rounded inner surface 12b. Accordingly, the bearing block 9 is equipped with a cylindrical bearing bore 9a, into which the intermediate ring 12 is inserted. The intermediate ring 12 can be pressed or adhered in. The fixing alternatives stated in relation to FIG. 2 are also feasible. Therefore, the location where the negatively rounded inner surface 12 is produced is changed from the bearing block 9 to the intermediate ring 1. After insertion of the intermediate ring 12, the structure of the bearing block 9 corresponds to that described in relation to FIG. 2. Accordingly, reference is made to the description in relation to FIG. 2. Alternatively, in the case of this embodiment the intermediate ring 12 can be split or slotted. In this case, the bearing bush 10 is then formed in one piece.

Although the invention has been described above with reference to a mobile crane and a pivot bearing assembly on a base of a jib, it is also feasible to use this pivot bearing assembly in other components of mobile cranes. Correspondingly, the pivot pins, the strap frame and the yoke-type frame are then adapted in terms of their size.

In the case of a mobile crane, the bearing of the luffing cylinder for the jib is also taken into consideration. When used for luffing cylinders 6, either only one bearing block 9 or, as previously described, two bearing blocks 9 are used per pivot bearing assembly 4b, 4c, depending on the structural size of the luffing cylinder 6, because the fastening straps on the luffing cylinder 6 are correspondingly narrow in comparison with the jib 5. The pivot bearing assembly 4b, 4c in accordance with the invention then allows the pivot pins of the luffing cylinders to be oriented in parallel with the pivot pin 11 of the jib 5.

In addition to mobile cranes, it is also possible to use said pivot bearing assembly in other cranes, excavators, other construction machines and agricultural machines if pivot bearing assemblies are used for jibs, rockers, arms, shafts or the like, the pivot region of which is not limited circumferentially but instead is limited to a small angular range.

LIST OF REFERENCE NUMERALS 1 super structure
1a yoke-type frame
2 rotational connection
3 lower carriage
4a first pivot bearing assembly
4b second pivot bearing assembly
4c third pivot bearing assembly
5 jib 5a base
6 luffing cylinder
7 strap frame
8 strap bore
9 bearing block
9a bearing block bore
9b inner surface
10 bearing bush
10a outer surface
10b bearing bore
11 pivot pin
12 intermediate ring
12a inner surface
12b outer surface
L longitudinal direction of the jib 5
l longitudinal direction of the pivot pin 11

The invention claimed is:

1. A pivot bearing assembly comprising:
a pivot pin and at least one bearing block with a bearing bush having a bearing bore received in the at least one bearing block, and wherein the pivot pin is slidingly supported in the bearing bore;
wherein the bearing bush has a spherical outer surface which is inserted into a negatively rounded inner surface in order to orient the bearing bush relative to the negatively rounded inner surface; and
wherein the bearing bush, after being oriented, is rotationally fixed in the bearing block relative to the negatively rounded inner surface.

2. A pivot bearing assembly as claimed in claim 1, wherein the bearing block is welded to a strap frame.

3. A pivot bearing assembly as claimed in claim 2, wherein the negatively rounded inner surface is formed in a bearing block bore.

4. A pivot bearing assembly as claimed in claim 3, wherein the bearing bush is adhered directly into the bearing block.

5. A pivot bearing assembly as claimed in claim 2, wherein the negatively rounded inner surface is formed in an intermediate ring which is inserted into the bearing block bore.

6. A pivot bearing assembly as claimed in claim 5, wherein the bearing bush is adhered into the intermediate ring.

7. A pivot bearing assembly as claimed in claim 1, wherein the negatively rounded inner surface is formed in a bearing block bore.

8. A pivot bearing assembly as claimed in claim 7, wherein the bearing bush is adhered directly into the bearing block.

9. A pivot bearing assembly as claimed in claim 1, wherein the negatively rounded inner surface is formed in an intermediate ring which is inserted into the bearing block bore.

10. A pivot bearing assembly as claimed in claim 9, wherein the bearing bush is adhered into the intermediate ring.

11. A pivot bearing assembly as claimed in claim 10, wherein the intermediate ring is adhered or pressed into the bearing block bore.

12. A pivot bearing assembly as claimed in claim 9, wherein the intermediate ring is adhered or pressed into the bearing block bore.

13. A pivot bearing assembly as claimed in claim 1, wherein the at least one bearing block includes two bearing blocks, wherein the bearing blocks are spaced apart from one another and support a common pivot pin.

14. A pivot bearing assembly as claimed in claim 13, wherein the two bearing bushes, after being oriented, are fixed in the bearing block such that, as seen in a longitudinal direction of the pivot pin, the bearing bores of the bearing bushes are aligned with one another.

15. A pivot bearing assembly as claimed in claim 1, wherein the bearing bore is cylindrical.

16. A pivot bearing assembly as claimed in claim 1, wherein the bearing bush is produced from synthetic material.

17. A mobile crane comprising a pivot bearing assembly as claimed in claim 1, wherein at least one chosen from a first said pivot bearing assembly is arranged between a superstructure and a base of a jib, a second said pivot bearing assembly is arranged between the superstructure and a luffing cylinder [and/or] and a third said pivot bearing assembly is arranged between the jib and the luffing cylinder.

18. A mobile crane as claimed in claim 17, wherein the at least one bearing block is welded to the superstructure or the jib.

19. A method of assembling a pivot bearing assembly, comprising:
a pivot pin and at least one bearing block with a bearing bush having a bearing bore is received in the at least one bearing block and wherein the pivot pin is slidingly supported in the bearing bore, wherein the bearing bush which has a rounded outer surface is inserted into a negatively rounded inner surface and the bearing bush is oriented, and the bearing bush, after being oriented, is rotationally fixed in the bearing block.

20. A method as claimed in claim 19, wherein the bearing bush is adhesively fixed in the bearing block.

* * * * *